United States Patent
Baumgarten et al.

(10) Patent No.: US 11,284,566 B2
(45) Date of Patent: Mar. 29, 2022

(54) COMBINE HARVESTER WITH PRODUCE DISTRIBUTION SUBSTRATEGIES

(71) Applicant: CLAAS Selbstfahrende Erntemaschinen GmbH, Harsewinkel (DE)

(72) Inventors: Joachim Baumgarten, Beelen (DE); Bastian Bormann, Guetersloh (DE); Andreas Wilken, Bissendorf (DE); Christopher Vieregge, Doerentrup (DE); Stefan Teroerde, Warendorf (DE); Christoph Heitmann, Warendorf (DE); Klaus Schaefer, Oelde (DE)

(73) Assignee: CLAAS Selbstfahrende Erntemaschinen GmbH, Harsewinkel (DE)

(*) Notice: Subject to any disclaimer, the term of this patent is extended or adjusted under 35 U.S.C. 154(b) by 255 days.

(21) Appl. No.: 16/519,177

(22) Filed: Jul. 23, 2019

(65) Prior Publication Data
US 2020/0060092 A1 Feb. 27, 2020

(30) Foreign Application Priority Data
Aug. 23, 2018 (DE) .................. 102018120651.8

(51) Int. Cl.
*A01D 41/12* (2006.01)
*A01F 12/40* (2006.01)
(Continued)

(52) U.S. Cl.
CPC ............. *A01D 75/28* (2013.01); *A01D 41/10* (2013.01); *A01D 41/1278* (2013.01); *A01F 12/40* (2013.01); *A01D 41/1243* (2013.01)

(58) Field of Classification Search
CPC .... A01D 75/28; A01D 41/10; A01D 41/1278; A01D 41/1243; A01F 12/40
(Continued)

(56) References Cited

U.S. PATENT DOCUMENTS

| 7,261,633 | B2* | 8/2007 | Benes ................ A01D 41/1243 460/111 |
| 7,306,174 | B2 | 12/2007 | Pearson et al. |
| 7,487,024 | B2* | 2/2009 | Farley ................ A01D 41/1243 701/50 |
| 9,516,812 | B2 | 12/2016 | Baumgarten et al. |
| 9,974,232 | B2* | 5/2018 | Shane ................. A01D 41/127 |

(Continued)

FOREIGN PATENT DOCUMENTS

| DE | 102014113965 A1 | 3/2016 |
| DE | 102016118187 A1 | 3/2018 |

(Continued)

OTHER PUBLICATIONS

European Search Report dated Jan. 16, 2020 issued in the corresponding EP application 19178620 (with English translation of relevant parts).

*Primary Examiner* — Alicia Torres
*Assistant Examiner* — Matthew Ian Neal
(74) *Attorney, Agent, or Firm* — Collard & Roe, P.C.

(57) ABSTRACT

A combine harvester for carrying out an agricultural harvesting process has a plurality of working units and a driver assistance system for controlling at least some of the working units. The combine harvester accommodates as working units a chaff cutter for comminuting harvested produce and a produce distributing arrangement in the rear area of the combine harvester downstream of the chaff cutter for distributing harvested produce on the field soil in adjustable throw directions. The respective throw direction comprises vector components of a horizontal throw direction and a vertical throw direction. The driver assistance system is adapted to optimize the control of the produce distributing arrangement by at least one of the substrategies including "throw direction correction" and/or "inclination-dependent (Continued)

produce distribution" and/or "produce distribution in longitudinal direction" and/or "produce distribution in transverse direction" with respect to at least one optimization criterion.

18 Claims, 5 Drawing Sheets

(51) Int. Cl.
    *A01D 75/28* (2006.01)
    *A01D 41/10* (2006.01)
    *A01D 41/127* (2006.01)
(58) Field of Classification Search
    USPC ........................................... 56/10.2 R
    See application file for complete search history.

(56) References Cited

U.S. PATENT DOCUMENTS

| | | | |
|---|---|---|---|
| 10,820,502 B2* | 11/2020 | Beavers | A01F 29/12 |
| 2011/0093169 A1 | 4/2011 | Schroeder et al. | |
| 2011/0270495 A1* | 11/2011 | Knapp | A01D 41/1243 |
| | | | 701/50 |
| 2018/0084718 A1 | 3/2018 | Baumgarten et al. | |
| 2018/0303030 A1* | 10/2018 | Heitmann | A01D 41/127 |
| 2020/0077591 A1* | 3/2020 | Xu | A01F 12/40 |

FOREIGN PATENT DOCUMENTS

| | | |
|---|---|---|
| EP | 1532858 A1 | 5/2005 |
| EP | 1570726 A1 | 9/2005 |
| WO | 03005803 A1 | 1/2003 |

\* cited by examiner

COMBINE HARVESTER WITH PRODUCE DISTRIBUTION SUBSTRATEGIES

CROSS-REFERENCE TO RELATED APPLICATIONS

This application claims priority under 35 USC 119 of German Application No. DE 102018120651.8, filed on Aug. 23, 2018, the disclosure of which is herein incorporated by reference.

BACKGROUND OF THE INVENTION

The invention is directed to a combine harvester for carrying out an agricultural harvesting process, having a plurality of working units and a driver assistance system for controlling at least some of the working units, wherein the combine harvester has working units in the form of a chaff cutter for comminuting harvested produce, and a produce distributing arrangement in the rear area of the combine harvester downstream of the chaff cutter for distributing harvested produce on the field soil in adjustable throw directions. The respective throw direction comprises vector components of a horizontal throw direction and a vertical throw direction.

Often, the non-grain constituents harvested by a combine harvester during the harvesting process are distributed directly on the harvested territory in order, for example, to improve soil quality. In this regard, it is important that the harvested produce, i.e., straw in this instance, is in such a state and is ejected in such a way that it decomposes easily so that its nutrient components are available in the subsequent growing season. The decomposition is influenced by various factors apart from external influences (including weather) and the soil composition (including microorganisms), for example by the distribution of the harvested produce on the field soil. For example, decomposition is promoted when the harvested produce distributed on the ground is spread homogeneously over the working width of the combine harvester.

DE 10 2014 113 965 A1 shows a systematization of the distribution of harvested produce on the field soil according to which the distribution is provided using distribution strategies which can be selected by the user. This basic type of control of the distributing arrangement results in high reproducibility in optimizing the distribution of harvested produce on the field soil. DE 10 2016 118 187 A1 is directed to a refinement of this strategy-based control of the distributing arrangement which provides a structuring of an overriding distribution strategy into subordinate substrategies.

While the known control measures provide a robust basic control structure for a reproducible distribution of harvested produce on the field soil, a range of cases are still not taken into account.

SUMMARY OF THE INVENTION

The problem upon which the invention is based is to configure and further develop the known combine harvester so as to further optimize the distribution of harvested produce on the field soil. A key fundamental consideration consists in that the throw characteristic of the distributing arrangement can be so adjusted with a modicum of substrategies which can be combined with one another so that a multitude of important constraints, e.g., a sloping of the field stand, is covered.

In particular, it is suggested that the driver assistance system is adapted to optimize the control of the produce distributing arrangement by means of at least one of the substrategies including "throw direction correction" and/or "inclination-dependent harvested produce distribution" and/or "harvested produce distribution in longitudinal direction" and/or "harvested produce distribution in transverse direction" with respect to at least one optimization criterion.

There are numerous conceivable possibilities for the at least one optimization criterion which can also be user-defined where appropriate. The optimization criterion is preferably a high uniformity in harvested produce distribution in transverse direction of the combine harvester and/or in longitudinal direction of the combine harvester.

The term "longitudinal direction" as used herein always refers to the longitudinal axis of the combine harvester in which the driving direction of the combine harvester is also oriented. In the present case and preferably, the longitudinal direction of the combine harvester is also the axis of symmetry for the chassis of the combine harvester.

The "throw direction correction" substrategy is employed to optimize the throw direction, i.e., the horizontal throw direction and/or the vertical throw direction. In this regard, the respective throw direction is always made up of the vector components of a horizontal throw direction and the vector components of a vertical throw direction.

Regarding the "inclination-dependent harvested produce distribution," the term "inclination" refers to an inclination of the ground and, therefore, of the combine harvester, with respect to the direction of gravity. An inclination of this kind is always linked to a change in the harvested produce distribution on the field soil, which is to be compensated in a corresponding manner by the driver assistance system.

For example, the "inclination-dependent harvested produce distribution" substrategy is advantageous when driving over a hump or when driving over a dip during which an adaptation of the vertical throw direction is required in order to satisfy the respective optimization criterion.

The "harvested produce distribution in longitudinal direction" substrategy is directed to a reproducible harvested produce distribution in longitudinal direction of the combine harvester at least by an adaptation of the vertical throw direction and/or of the throw speed.

Advantageous scenarios for the application of the "harvested produce distribution in longitudinal direction" substrategy can be accomplished if the harvested produce distribution on the field soil in the longitudinal direction of the combine harvester corresponds to predetermined optimization criteria.

The "harvested produce distribution in transverse direction" substrategy relates to a reproducibility of the harvested produce distribution in transverse direction of the combine harvester at least by means of an adaptation of the horizontal throw direction and/or the throw speed. In a particularly preferred configuration, the harvested produce distributions on the field soil of two adjacent driving tracks are contiguous to one another. This also ensures a uniform harvested produce distribution on the field soil transverse to the driving tracks.

The implementation of the suggested substrategies can be model-based and/or sensor-based. In a preferred configuration, a sensor arrangement is provided for detecting the harvested produce distribution on the current driving track and/or on adjacent driving tracks on the basis of which the driver assistance system carries out the optimization of the control of the harvested produce distribution. This results in a closed loop control system which can also take into account uncharted field features, for example, unforeseen obstacles.

In principle, the distribution width on the field soil can be adjusted through a synchronization of the throw direction range and the throw speed range. Precise adjustment of the distribution width plays an important part particularly when adjusting the distribution of the harvested produce to the above-mentioned adjacent driving tracks.

In order to ensure that the operator is actively involved in the proper distribution of the harvested produce on the field soil, the driver assistance system can be outfitted with an input/output device with which, for example, individual distribution selections can be entered by the user.

The suggested solution allows for the documentation and storage of information which can be useful in subsequent agricultural harvesting processes on the same field or on other fields. Correspondingly, it is suggested that the driver assistance system generates corresponding georeferenced harvesting process data and stores them locally or remotely.

The suggested solution can be employed in a particularly appropriate and simultaneously efficient manner when the combine harvester has distributing units which are controllable independent from one another and which are preferably provided in the form of radial distributors. However, it is also conceivable in principle to provide two symmetrically controlled distributing units. Finally, in a variant which can be realized in a particularly simple manner, it is conceivable to outfit the distributing arrangement with an individual distributing unit which is oriented to the longitudinal direction of the combine harvester.

BRIEF DESCRIPTION OF THE DRAWINGS

The invention will be described in more detail in the following referring to drawings in which only one embodiment example is depicted. In the drawings.

DETAILED DESCRIPTION OF THE EMBODIMENTS

Figure 1:
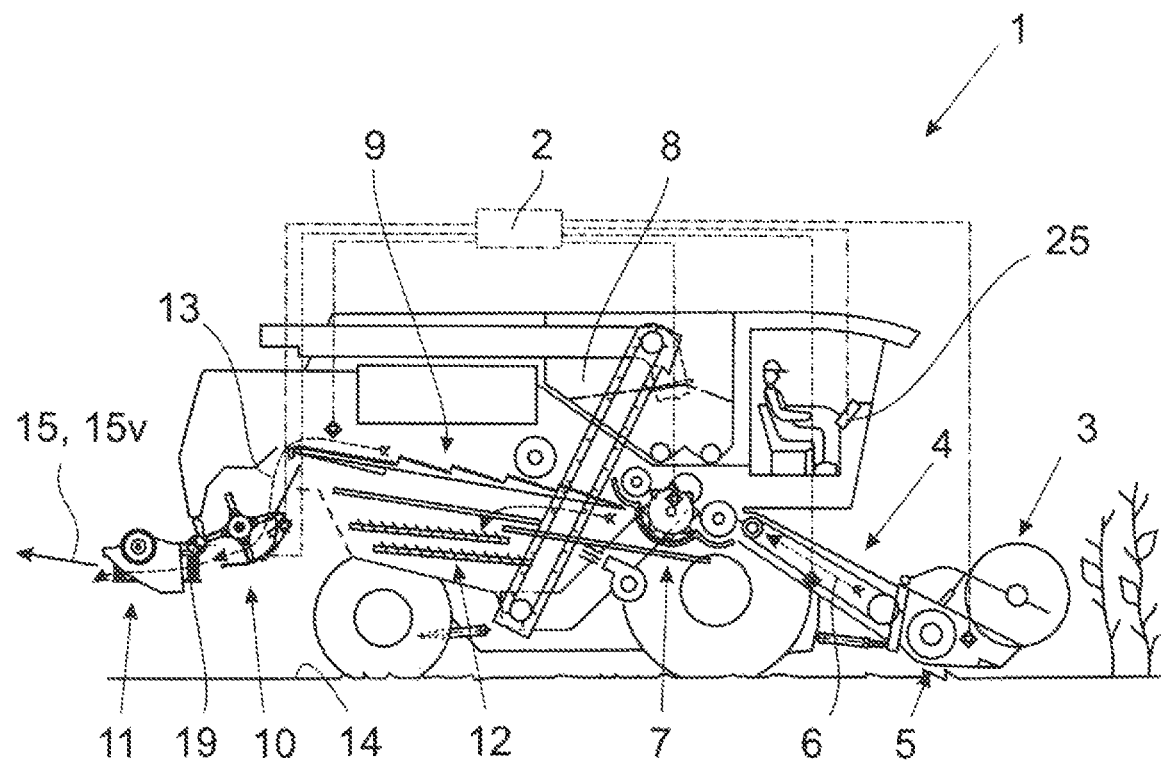
FIG. 1 is a schematic side view of a suggested combine harvester.

The combine harvester 1 which is shown schematically in FIG. 1 serves to execute an agricultural harvesting process. It has a plurality of working units to be described in the following and a driver assistance system 2 for controlling at least some of the working units. The combine harvester 1 accommodates as working unit a front attachment constructed, for example, as a grain cutting mechanism 3 which is connected in a manner known per se to an inclined conveyor 4. The transverse conveying member 5 of the grain cutting mechanism 3 transfers harvested produce 6 picked up by the grain cutting mechanism 5 to the inclined conveyor 4, and the inclined conveyor 4 transfers the harvested produce 6 to the threshing mechanism 7. The grains separated in the threshing mechanism pass directly into the grain tank 8. A residual partial stream of grains, short straw and chaff is guided to a separating device 9 in which the grains are separated from the short straw and chaff. The partial stream consisting essentially of short straw and chaff is now fed to a chaff cutter 10 in which the straw components are comminuted and fed to a produce distributing arrangement 11. A further partial stream of grains, short straw and chaff that has been fed neither to the grain tank 8 nor to the chaff cutter 10 up to this point proceeds from the separating device 9. This partial stream runs through a cleaning device 12 which is adapted to extract the remaining grains and transfer them to the grain tank 8. The residual partial stream which substantially comprises short straw and chaff is either fed to the produce distributing arrangement 11 or deposited directly on the field soil 14.

Figure 2:
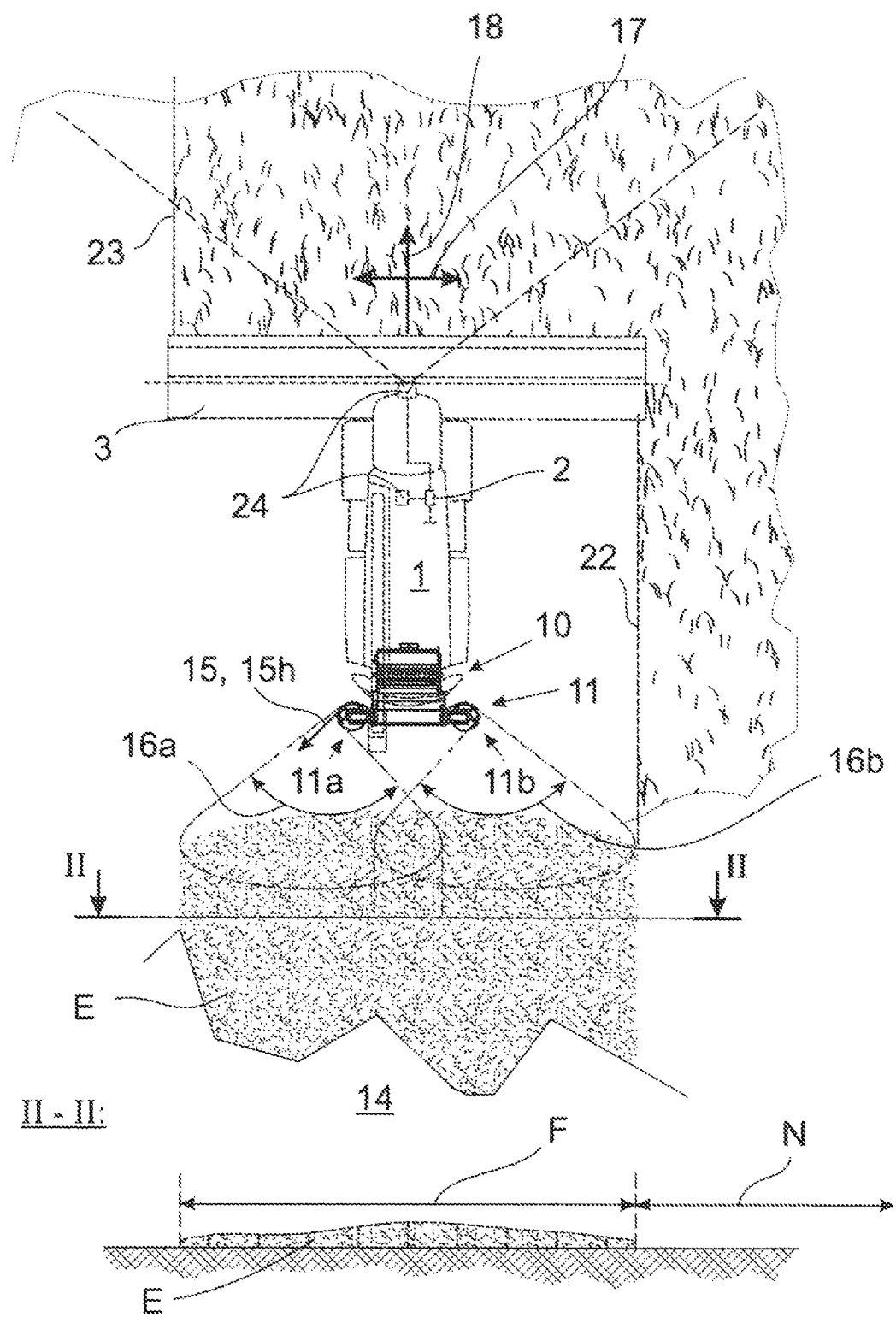
FIG. 2 is a top view of the arrangement according to FIG. 1 along section line II-II.
Figure 3:
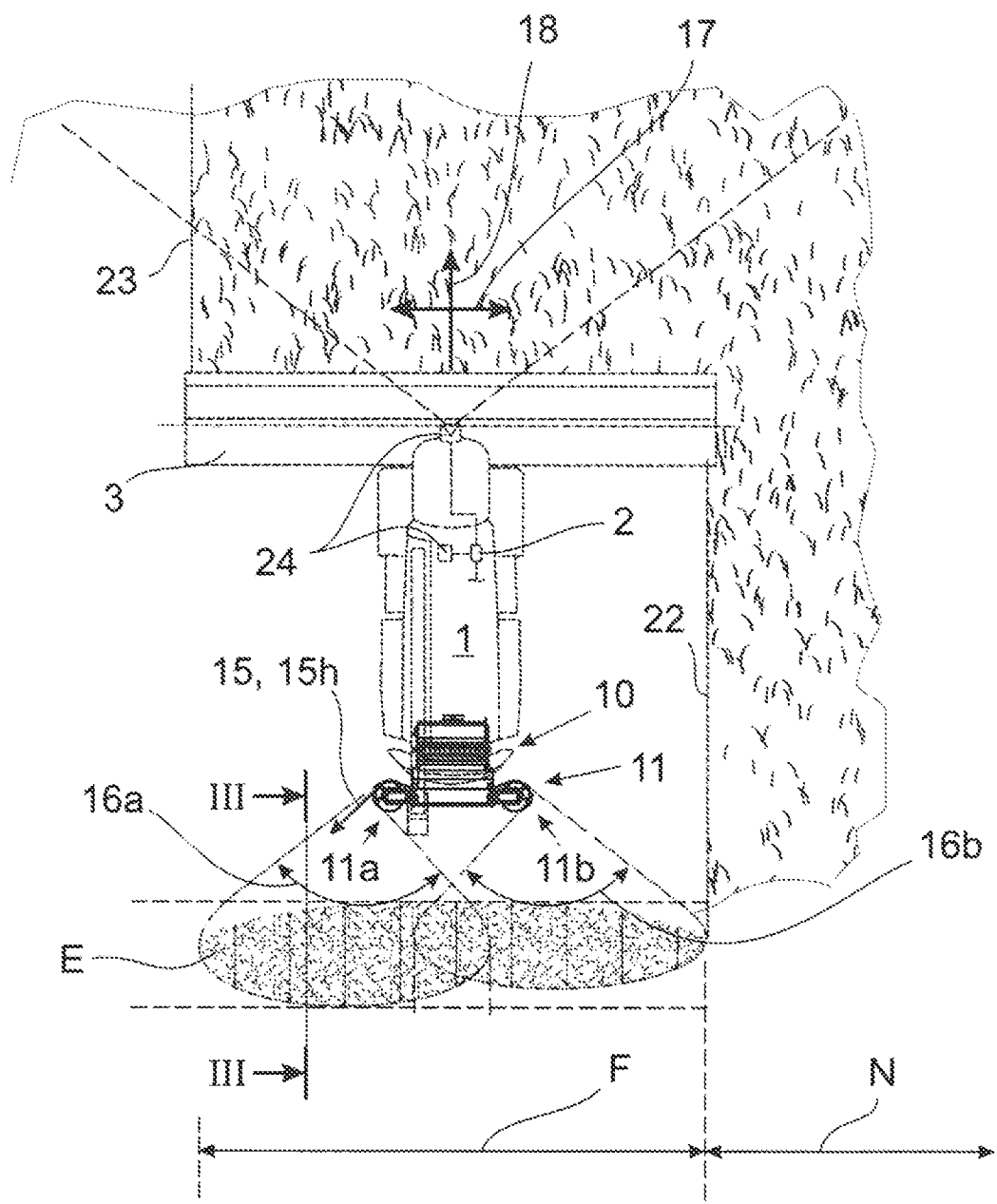
FIG. 3 is a top view of the arrangement according to FIG. 2 along section line III-III.
Figure 3:
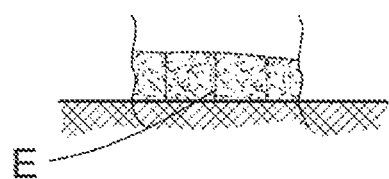

The chaff cutter 10 and the produce distributing arrangement 11 are arranged in the rear area of the combine harvester 1 and serve to distribute harvested produce 13 that has already been threshed on the field soil 14 in adjustable throw directions 15. In this respect, it must be taken into account that the harvested produce 13 can be ejected in numerous throw directions 15 depending on the constructional configuration. In the present case and preferably, the distributing arrangement 11 has two distributing units 11a, 11b which eject the harvested produce 13 cyclically in each instance over a predetermined throw direction range 16a, 16b. Only one throw direction 15 is shown by way of example in FIGS. 1 to 5. When FIGS. 1 and 2 are viewed in conjunction, it will be seen that the respective throw direction 15 is made up of the vector components of a horizontal throw direction 15h and vector components of a vertical throw direction 15v.

It is key that the driver assistance system 2 is adapted to optimize the control of the produce distributing arrangement 11 by means of at least one of the substrategies including "throw direction correction" and/or "inclination-dependent harvested produce distribution" and/or "harvested produce distribution in longitudinal direction" and/or "harvested produce distribution in transverse direction" with respect to at least one optimization criterion.

The above-mentioned substrategies are to some extent the methods by which the above-mentioned at least one optimization criterion is met. In this regard, an exemplary optimization criterion is preferably a high degree of uniformity in the harvested produce distribution on the field soil 14, namely in transverse direction 17 of the combine harvester 1 and/or in longitudinal direction 18 of the combine harvester. A uniform harvested produce distribution on the field soil 14 promotes the aforementioned advantageous decomposition of the harvested produce 13. An exemplary harvested produce distribution on the field soil 14 in transverse direction is shown in the sectional view according to FIG. 2.

Alternatively or additionally, it can be provided that an optimization criterion relates to the adjustment of a predetermined harvested produce distribution on the field soil 14, particularly a predetermined harvested produce distribution in longitudinal direction 18 and/or in transverse direction 17 of the combine harvester 1. Depending on the subsequent working of the field, different, predetermined harvested produce distributions may be advantageous in this case. A harvested produce distribution in longitudinal direction 18 of the combine harvester 1 is shown by way of example in the sectional view according to FIG. 3.

Alternatively or additionally, it can be provided that an optimization criterion relates to the adjustment of the harvested produce distribution E within the current driving track F.

The "throw direction correction" substrategy preferred in the present case effects an optimization of the throw direction 15 of the harvested produce 13 by means of an adaptation of the horizontal throw direction 15h and/or of the vertical throw direction 15v.

An adaptation of the horizontal throw direction 15h is made possible in a particularly simple manner through adjustable spreading plates in the distributing units 11a, 11b which are preferably configured as radial distributors. In this regard, reference is made to German Patent Application DE 10 2014 113 965 A1 of the present applicant, the disclosure of which is incorporated to this extent in the present application.

The vertical throw direction 15v can be realized in a particularly simple manner in that the distributing arrangement 11 in its entirety or the distributing units 11a, 11b individually is or are swivelable around a swiveling axis 19 which is oriented parallel to the transverse direction 17 of the combine harvester 1.

The "inclination-dependent harvested produce distribution" substrategy preferably brings about an optimization of the control of the produce distributing arrangement 11 depending on the transverse inclination $\varphi_q$ and/or the longitudinal inclination $\varphi_l$ of the combine harvester 1 through an adaptation of the horizontal throw direction 15h and/or of the vertical throw direction 15v and/or of the throw speed. The throw speed can be realized in a distributing unit 11a, 11b configured as radial distributor in that the speed of the throw blower is varied in a corresponding manner. In this regard, reference is again made to the above-cited patent application DE 10 2014 113 965 A1.

Figure 4:
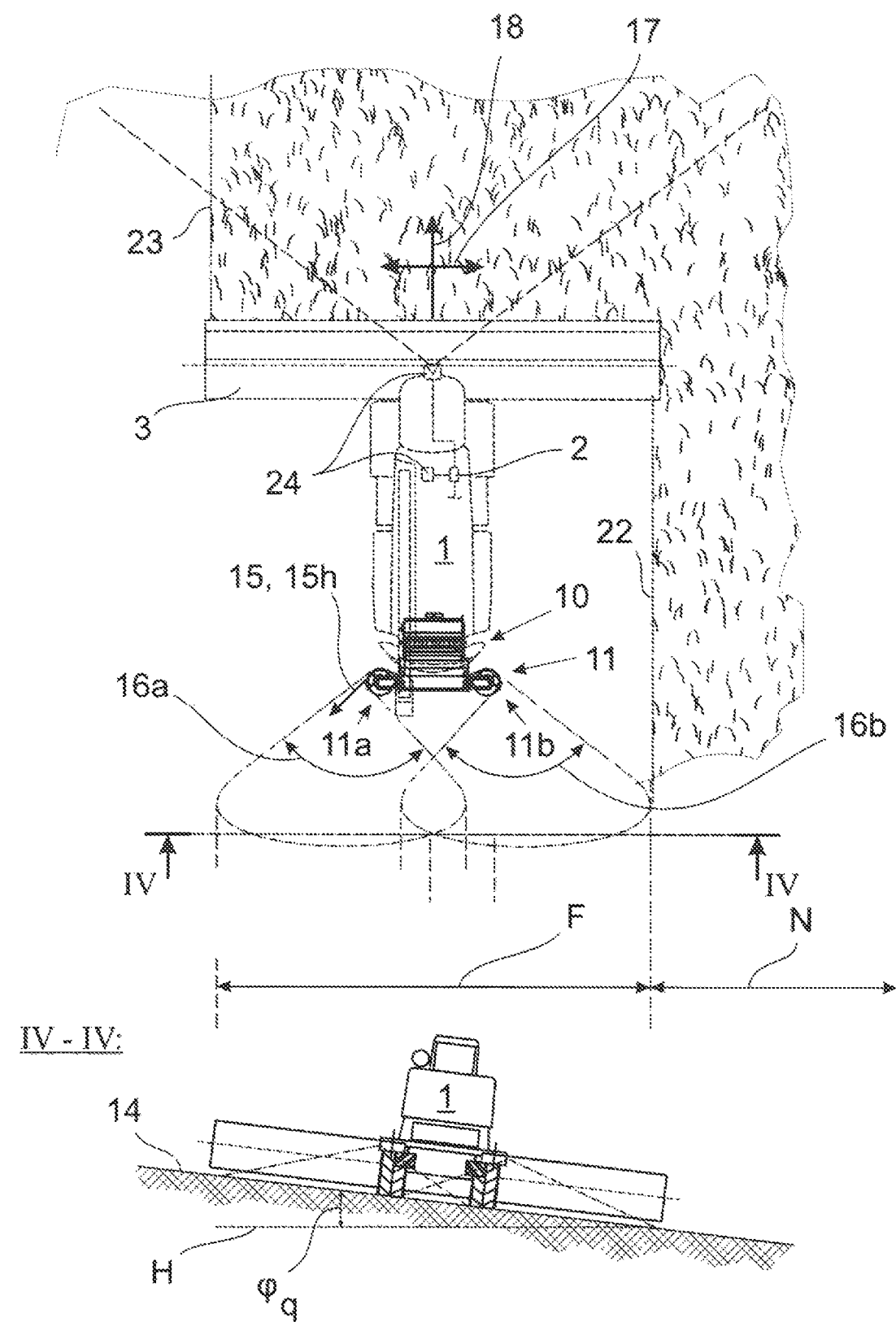
FIG. 4 is a top view of the arrangement according to FIG. 1 in a second harvesting situation along section line IV-IV.
Figure 5:
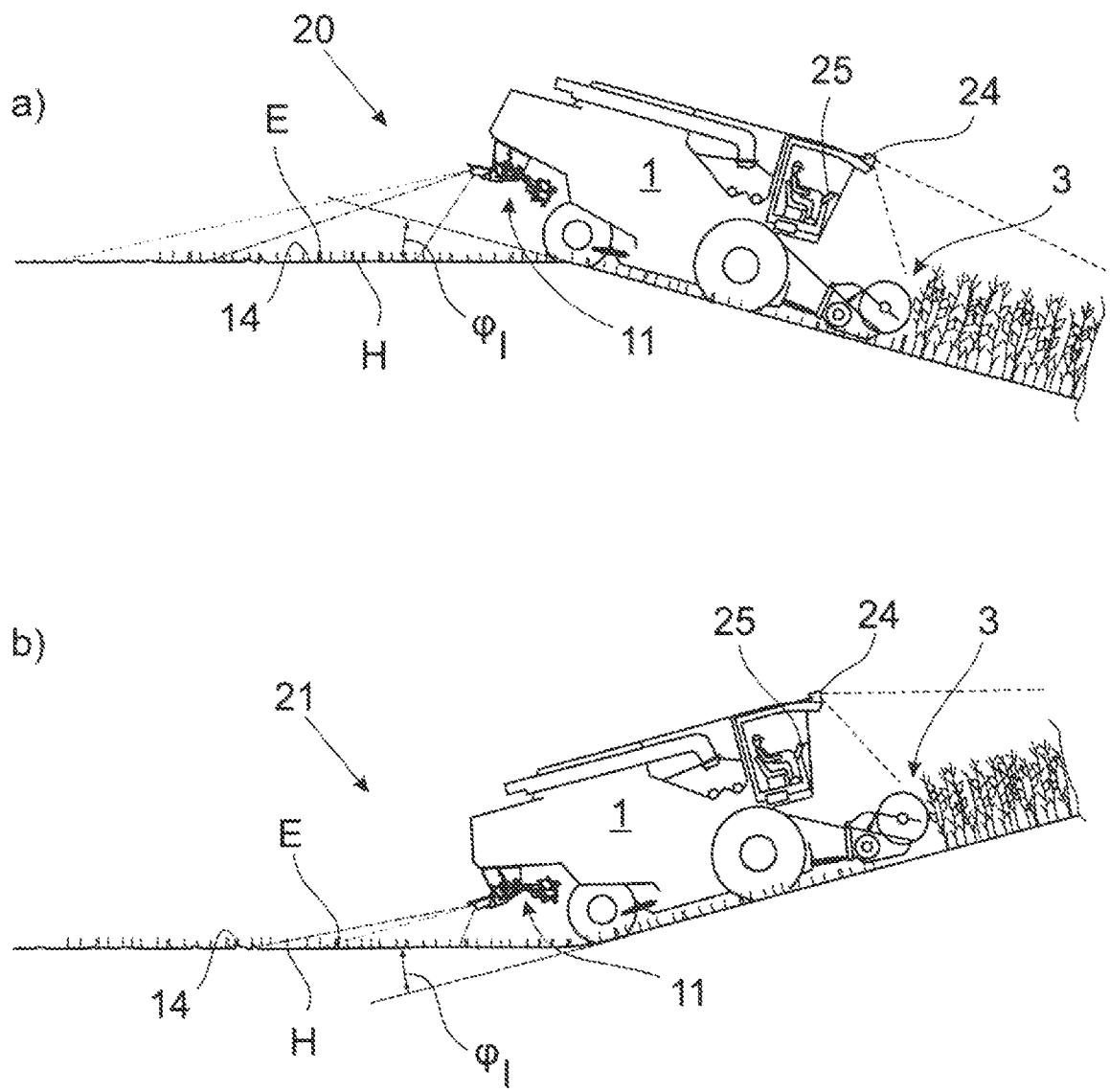
FIG. 5 is a side view of the arrangement according to FIG. 1 in a third harvesting situation a) when driving over a dip and b) when driving over a hump.

FIG. 4 shows the situation in which there is a transverse inclination by angle $\varphi_q$ relative to the horizontal H. Because of the transverse inclination $\varphi_q$, a shifting of the harvested produce distribution in transverse direction 17 of the combine harvester 1 would come about if no countermeasures were taken. Preferably, the throw direction 15 of the distributing arrangement 11 is adapted such that the harvested produce distribution E always lies within the current driving track F.

In the harvesting situation shown in FIG. 4, the optimization of the control of the produce distributing arrangement 11 is realized through an adaptation of the horizontal throw direction 15h. The resulting distribution of the harvested produce is shown in dashed lines in FIG. 4.

Alternatively or additionally, it may happen that a longitudinal inclination $\varphi_l$ results when driving over a dip 20 according to FIG. 5a or when driving over a hump 21 according to FIG. 5b. In a particularly preferred configuration, it is provided that the "inclination-dependent produce distribution" substrategy brings about an optimization of the control of the produce distributing arrangement 11 depending on the longitudinal inclination $\varphi_l$ of the combine harvester 1 through an adaptation of the vertical throw direction 15v. The results of the optimized control are shown by the throw trajectories depicted in dashed lines. For example, the harvested produce distribution in longitudinal direction 18 can easily be made uniform with the suggested solution as is shown in the sectional view according to FIG. 3, although the combine harvester 1 drives over dip 20 according to FIG. 5a and the hump according to FIG. 5b.

The "produce distribution in longitudinal direction" substrategy brings about the optimization of the control of the produce distributing arrangement 11 with respect to the produce distribution in longitudinal direction 18 of the combine harvester 1 at least through an adaptation of the vertical throw direction 15v and/or throw speed. This substrategy can be applied regardless of whether or not there is a longitudinal inclination of the combine harvester 1.

The "produce distribution in longitudinal direction" substrategy is also applied when stopping the combine harvester 1 in order to ensure that no accumulation of harvested produce occurs following the stopping of the combine harvester 1. In particular, it is suggested that the driver assistance system 2 detects a stopping of the combine harvester 1 and, on this basis, adapts the harvested produce distribution E in longitudinal direction 18 of the combine harvester 1 with respect to the at least one optimization criterion.

In a particularly preferred configuration, the driver assistance system 2 controls the produce distributing arrangement 11 in such a way that the harvested produce distribution E on the field soil 14 has no accumulation of harvested produce. This can be realized, for example, in that the vertical throw direction 15v is deflected upward and the throw speed is increased during the stoppage so that the surplus harvested produce is distributed over the field soil 14 that has already been traveled over and does not result in the accumulation of harvested produce, for example.

With the "produce distribution in longitudinal direction" substrategy, it is also possible to react when entering a headland area. In particular, it is suggested that the driver assistance system 2 detects the course of a headland area and, on the basis thereof, adapts the control of the produce distributing arrangement 11 with respect to the at least one optimization criterion. In a particularly preferred configuration, the driver assistance system 2 controls the produce distributing arrangement 11 such that the headland area is exempted from the harvested produce distribution E. This substrategy can also be advantageous during an oblique approach to a headland whose edge is approached at an angle so that, for example, a high level of uniformity of the harvested produce distribution, as mentioned above, can also be achieved during an oblique approach of this kind.

A further preferred substrategy, "produce distribution in transverse direction", brings about an optimization of the control of the produce distributing arrangement 11 with respect to the produce distribution in transverse direction 17 of the combine harvester 1 at least through an adaptation of the horizontal throw direction 15h and/or of the throw speed. In this way, in particular, a uniform produce distribution can be achieved in transverse direction 17 of the combine harvester 1 as can be discerned from the sectional view according to FIG. 2.

In the suggested "produce distribution in transverse direction" substrategy, a weather-dependent influencing factor, namely, a possible crosswind, plays a particular part. A crosswind of this kind can result in a shifting of the entire harvested produce distribution E, which can be correspondingly compensated by the "produce distribution in transverse direction" substrategy. In this case, the driver assistance system 2 preferably determines a crosswind in the area of the produce distributing arrangement 11 and controls the produce distributing arrangement 11 depending on the determined crosswind. A crosswind of this kind can be determined in a simple manner by a corresponding wind sensor.

The "produce distribution in transverse direction" substrategy is configured in a further preferred arrangement in such a way that the driver assistance system 2 determines the state of a neighboring driving track N and controls the produce distributing arrangement 11 depending on the state of the neighboring driving track N. In this respect, the determination can show that the neighboring driving track N is actually a field boundary. The neighboring driving track N is shown in reduced size in the drawing as a general overview.

In a particularly preferred configuration, the driver assistance system 2 exempts the neighboring driving track N from the harvested produce distribution E on the field soil in the event that the state of the neighboring driving track N is the state of a field crop which has not yet been harvested or a field boundary. This ensures that no harvested produce 13 is distributed in areas where this distribution is even disadvantageous.

The determination of the state of the neighboring driving track N can be detected, for example, by sensor by means of a camera or the like. However, it is also conceivable that charting data which may exist in a database are used for this purpose.

In case the state of the neighboring driving track N is the state of a harvested stubble area, the distribution of harvested produce can easily be expanded to the neighboring driving track N. For example, a defined overlapping between driving tracks F, N can be provided in this instance so that the area between driving tracks F, N is also reliably covered with harvested produce.

Another type of optimization consists in that the driver assistance system 2 determines a crop stand edge 22 associated with the respective current driving track F or determines the crop stand edges 22, 23 associated with the respective current driving track F and maintains a predetermined transverse distance relative to the crop stand edge 22 or crop stand edges 22, 23. This is an alternative to the above-mentioned overlapping between driving tracks F, N.

In a further preferred configuration, the driver assistance system 2 determines the course of a neighboring driving track N, and the produce distributing arrangement 11 is controlled by means of the driver assistance system 2 depending on the determined course of the neighboring driving track N. In a particularly preferred configuration, the driver assistance system 2 then controls the produce distributing arrangement 11 such that the harvested produce distributions E on the field soil 14 of two adjacent driving tracks F, N are contiguous.

As mentioned above, the combine harvester 1 is preferably outfitted with a sensor arrangement 24 for detecting the harvested produce distribution E on the current driving track F and/or on adjacent driving tracks N, on the basis of which the driver assistance system 2 carries out the optimization of the control of the produce distributing arrangement 11. This sensor arrangement 24 can also be applied for detecting the longitudinal inclination $\varphi_l$ shown in FIG. 5, the transverse inclination $\varphi_q$ shown in FIG. 4 and the crop stand edges 22, 23 shown in FIGS. 2 to 4, or the like. The sensor arrangement 24 can have at least one laser distance sensor, a camera, or the like.

The above-mentioned substrategies may be due at least partially to the fact that a predetermined distribution width of the harvested produce distribution E is maintained in transverse direction 17 of the combine harvester 1. Correspondingly, in the present case and preferably, the distribution width on the field soil 14 is adjustable by synchronizing the throw direction range with the throw speed range.

It is indicated in FIG. 1 that the driver assistance system 2 has a human-machine interface, in the present case and preferably an input/output device 25, and operating parameters, in the present case and preferably the at least one substrategy or strategy parameters related to the latter, can be entered by the user via the input/output device 25. The suggested solution can be implemented with a high level of user comfort in this way.

For example, it can be provided that the cutting mechanism width of the grain cutting mechanism 3 can be entered via the input/output device 25, and the driver assistance system 2 controls the produce distributing arrangement 11 as a function of the entered cutting mechanism width.

Broadly speaking, it can also be provided that individual distributions selected by the operator can be entered via the input/output device 25, and the driver assistance system 2 again controls the produce distributing arrangement 11 depending on these selected distributions.

The suggested solution can be used additionally for charting the respective field. For this purpose, it is suggested that the driver assistance system 2 references the control of the distributing arrangement 11 and/or the harvested produce distribution E on the field soil 14 with position data and stores them as georeferenced harvesting process data in a local database and/or in a remote database. This makes it possible to have recourse to the previously performed harvested produce distribution E in subsequent processing steps, for example, in order to estimate the humus formation until the next processing.

As was mentioned earlier, the distributing arrangement 11 can comprise an individual distributing unit 11a. In the present case and preferably, however, the distributing arrangement 11 has two distributing units 11a, 11b, and the two distributing units 11a, 11 b are arranged on opposite sides with reference to the longitudinal direction 18 of the combine harvester 1, and the two distributing units 11a, 11 b are controllable independent from one another by means of the driver assistance system 2. This results in the greatest possible flexibility with respect to the suggested substrategies.

REFERENCE NUMERALS 1 combine harvester
2 driver assistance system
3 grain cutting mechanism
4 inclined conveyor
5 transverse conveying member
6 harvested produce
7 threshing mechanism
8 grain tank
9 separating device
10 chaff cutter
11 produce distributing arrangement
11a, b distributing units
12 cleaning device
13 threshed harvested produce
14 field soil
15 throw directions
15h horizontal throw direction
15v vertical throw direction
16a, b throw direction ranges
17 transverse direction
18 longitudinal direction
19 swiveling axis
20 dip
21 hump
22, 23 crop stand edges
24 sensor arrangement
25 input/output device

What is claimed is:

1. A combine harvester for carrying out an agricultural harvesting process, comprising:

a plurality of working units comprising a chaff cutter for comminuting harvested produce and a produce distributing arrangement in a rear area of the combine harvester downstream of the chaff cutter for distributing harvested produce on field soil in adjustable throw directions, the throw directions comprising vector components of a horizontal throw direction and a vertical throw direction, and a driver assistance system configured for controlling at least one of the working units, wherein the driver assistance system is adapted to optimize a throwing characteristic of the produce distributing arrangement by combining sub-strategies, wherein control of the produce distributing arrangement is achieved by combining the substrategies that comprise throw direction correction, inclination-dependent produce distribution, produce distribution in a longitudinal direction and produce distribution in a transverse direction, with respect to at least one predefined optimization criterion, wherein the throw direction correction substrategy effects an optimization of the throw direction of the harvested produce by means of an adaptation of the horizontal throw direction and/or of the vertical throw direction, wherein the inclination-dependent produce distribution substrategy brings about an optimization of the control of the produce distributing arrangement depending on the transverse inclination and/or the longitudinal inclination of the combine harvester through an adaptation of the horizontal throw direction and/or of the vertical throw direction and/or of the throw speed, wherein the produce distribution in longitudinal direction substrategy brings about an optimization of the control of the produce distributing arrangement with respect to the produce distribution in the longitudinal direction of the combine harvester at least through an adaptation of the vertical throw direction and/or of a throw speed, and wherein the produce distribution in a transverse direction substrategy brings about an optimization of the control of the produce distributing arrangement with respect to the produce distribution in the transverse direction of the combine harvester at least through an adaptation of the horizontal throw direction and/or of the throw speed.

2. The combine harvester according to claim 1, wherein the driver assistance system detects driving over a hump and adapts at least the vertical throw direction to the optimization criterion, and/or the driver assistance system detects driving over a dip and adapts at least the vertical throw direction to the at least one optimization criterion.

3. The combine harvester according to claim 1, wherein the driver assistance system detects a stopping of the combine harvester and, on this basis, adapts the produce distribution in the longitudinal direction of the combine harvester with respect to the at least one optimization criterion such that the driver assistance system controls the produce distributing arrangement in such a way that the produce distribution on the field soil has no accumulation of harvested produce.

4. The combine harvester according to claim 1, wherein the driver assistance system is configured to detect a course of a headland area and, on the basis thereof, adapt the control of the produce distributing arrangement with respect to the at least one optimization criterion, so that the driver assistance system exempts the headland area from the harvested produce distribution.

5. The combine harvester according to claim 1, wherein the driver assistance system is configured to determine a crosswind in an area of the produce distributing arrangement and control the produce distributing arrangement depending on the determined crosswind.

6. The combine harvester according to claim 1, wherein the driver assistance system is configured to determine a state of a neighboring driving track (N) and control the produce distributing arrangement depending on a state of the neighboring driving track (N).

7. The combine harvester according to claim 1, wherein the driver assistance system exempts a neighboring driving track (N) from the produce distribution on field soil in the event that a state of the neighboring driving track (N) is the state of a field crop which has not yet been harvested or a field boundary.

8. The combine harvester according to claim 1, wherein the driver assistance system expands the produce distribution on the field soil to a neighboring driving track (N) in case a state of the neighboring driving track (N) is the state of a harvested stubble area.

9. The combine harvester according to claim 1, wherein the driver assistance system determines a crop stand edge associated with a respective current driving track (F) or determines crop stand edges associated with the respective current driving track and maintains a predetermined transverse distance relative to the crop stand edge or crop stand edges.

10. The combine harvester according to claim 1, wherein the driver assistance system determines a course of a neighboring driving track (N) and controls the produce distributing arrangement depending on a determined course of the neighboring driving track (N) such that the harvested produce distributions on the field soil of two adjacent driving tracks (F) are contiguous.

11. The combine harvester according to claim 1, further comprising a sensor arrangement configured for detecting the harvested produce distribution (E) on a current driving track (F) and/or on adjacent driving tracks (F), on the basis of which the driver assistance system carries out the optimization of the control of the produce distributing arrangement.

12. The combine harvester according to claim 1, wherein the driver assistance system is configured such that a distribution width on the field soil is adjustable by synchronizing a throw direction range with a throw speed range.

13. The combine harvester according to claim 1, wherein the driver assistance system has an input/output device that is configured to receive operating parameters entered by a user.

14. The combine harvester according to claim 13, wherein the combine harvester has a grain cutting mechanism with a cutting mechanism width, wherein the cutting mechanism width can be entered via the input/output device, and wherein the driver assistance system controls the produce distributing arrangement depending on the cutting mechanism width.

15. The combine harvester according to claim 13, wherein individual distributions selected by the operator can be entered via the input/output device, and wherein the driver assistance system controls the produce distributing arrangement depending on the selected distributions.

16. The combine harvester according to claim 1, wherein the driver assistance system is configured to reference control of the distributing arrangement and/or the harvested produce distribution (E) on the field soil with position data and store them as georeferenced harvesting process data in a local database and/or in a remote database.

17. The combine harvester according to claim 1, wherein the distributing arrangement has two distributing units in the form of two distributing units arranged on opposite sides with reference to the longitudinal direction of the combine harvester, and wherein the two distributing units are controllable independent from one another by the driver assistance system.

18. The combine harvester according to claim 1, wherein the at least one predefined optimization criterion relates to uniformity in the produce distribution on the field soil in a transverse direction of the combine harvester and/or in a longitudinal direction of the combine harvester, and/or wherein the at least one optimization criterion relates to an adjustment of a predetermined produce distribution in the longitudinal direction of the combine harvester and/or in the transverse direction of the combine harvester, and/or wherein the at least one optimization criterion relates to the adjustment of the harvested produce distribution within the respective current driving track.

* * * * *